(12) United States Patent
Chawla et al.

(10) Patent No.: US 12,547,677 B1
(45) Date of Patent: Feb. 10, 2026

(54) ANTICIPATORY AUTHENTICATION FOR ACCOUNT-SPECIFIC ARTIFICIAL INTELLIGENCE AGENTS

(71) Applicant: Airia LLC, Alpharetta, GA (US)

(72) Inventors: Ravish Chawla, Atlanta, GA (US); Spencer Reagan, Marietta, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/211,129

(22) Filed: May 16, 2025

(51) Int. Cl.
*G06F 21/10* (2013.01)

(52) U.S. Cl.
CPC .................................. *G06F 21/10* (2013.01)

(58) Field of Classification Search
CPC ....................................................... G06F 21/10
See application file for complete search history.

(56) References Cited

U.S. PATENT DOCUMENTS

| | | | | |
|---|---|---|---|---|
| 10,042,636 | B1* | 8/2018 | Srivastava | G06N 20/00 |
| 10,757,093 | B1* | 8/2020 | Salinas | H04L 63/083 |
| 12,254,272 | B1* | 3/2025 | Cetoli | G06F 40/40 |
| 12,260,260 | B1* | 3/2025 | Gorman | G06F 9/468 |
| 12,282,719 | B1* | 4/2025 | Fedoruk | G06N 3/0475 |
| 2018/0077131 | A1* | 3/2018 | Averboch | H04L 63/0884 |
| 2019/0044949 | A1* | 2/2019 | Bartfai-Walcott | H04W 12/63 |
| 2022/0060479 | A1* | 2/2022 | Perkins | H04L 63/083 |
| 2024/0143722 | A1* | 5/2024 | Kieffer | G06F 21/40 |
| 2024/0273411 | A1* | 8/2024 | Mueck | H04L 9/3263 |
| 2024/0298194 | A1* | 9/2024 | Mueck | G06N 20/00 |
| 2025/0063083 | A1* | 2/2025 | Grinberg | G06Q 10/06393 |
| 2025/0156898 | A1* | 5/2025 | Crabtree | G06Q 30/0277 |
| 2025/0165296 | A1* | 5/2025 | Hwang | G06F 9/5027 |
| 2025/0168132 | A1* | 5/2025 | Kuo | H04L 51/52 |
| 2025/0227511 | A1* | 7/2025 | Chai | G06N 3/0442 |

\* cited by examiner

*Primary Examiner* — Harris C Wang
(74) *Attorney, Agent, or Firm* — Clayton, McKay & Bailey, PC

(57) ABSTRACT

A system allows users to utilize AI agents that access user-specific accounts (e.g., for tools) rather than just global tools that use a system login. The AI agent can execute multiple agent objects, such as an AI model. A tool can be assigned to an AI object, such that the tool is used when the AI object executes. An agent executor can check with an authentication service to determine whether the user is authenticated with a provider of the tool. If not, the agent executor can pause AI agent execution, store a current state, and prompt the user for authentication, which can appear in a window utilized by the AI agent. With a successful authentication, the agent executor resumes execution of the AI agent at the stored current state and stores an authorization token for use with the tool.

20 Claims, 8 Drawing Sheets

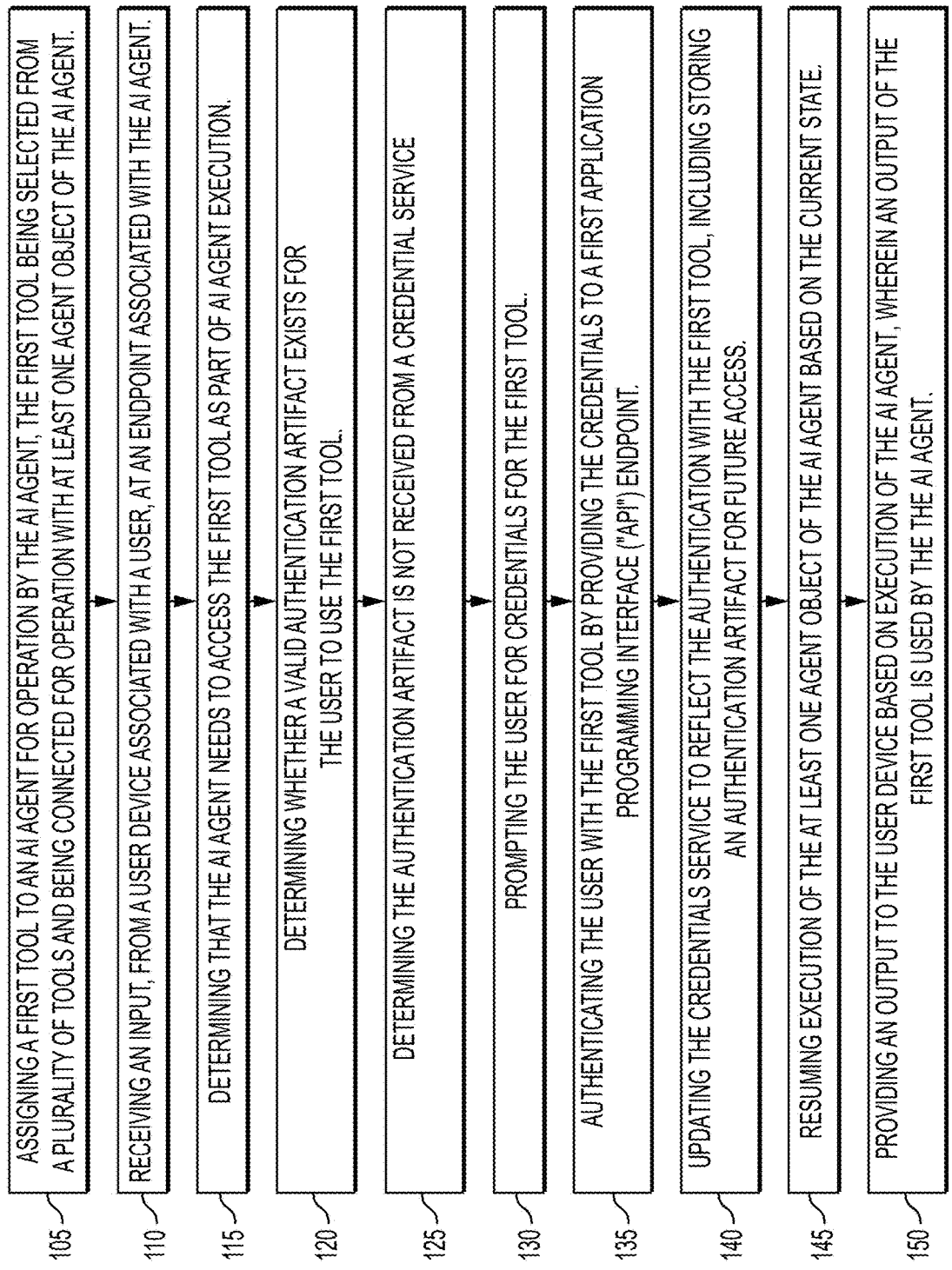

< ⓐ SONNET SEARCH AGENT | SALESFORCE AGENT | ⌀ NEW THREAD

ARTIFACTS ∨ | CAN YOU GET INFO ON THE SF ACCOUNT? —415 | ⌑ BOOKMARK

⬡ ◦°˚ USING SALESFORCE - ACCOUNT DETAILS TOOLS
✓ ACCOUNT AUTHENTICATED —480

LOREM IPSUM DOLOR SIT AMET, CONSECTETUER ADIPISC-
ING ELIT, SED DIAM NONUMMY NIBH EUISMOD TINCIDUNT UT
LAOREET DOLORE MAGNA ALIQUAM ERAT VOLUTPAT. UT
WISI ENIM AD MINIM VENIAM, QUIS NOSTRUD EXERCI TATION ← 490
ULLAMCORPER SUSCIPIT LOBORTIS NISL UT ALIQUIP EX EA
COMMODO CONSEQUAT. DUIS AUTEM VELEUM IRIURE
DOLOR IN HENDRERIT IN VULPUTATE VELIT ESSE MOLESTIE

ANTICIPATORY AUTHENTICATION FOR ACCOUNT-SPECIFIC ARTIFICIAL INTELLIGENCE AGENTS

BACKGROUND

Artificial intelligence ("AI") agents leverage existing AI infrastructure, such as AI models. However, many additional actions require the use of tools. For example, tools can enable an AI agent to communicate with third-party providers and take actions on behalf of a user. For example, tools can give a user access to their cloud storage, their bank account, or to a social media account.

Many tools, such as GOOGLE- and MICROSOFT-based services, require the user to authenticate before the tools can be used. AI platforms currently globally authenticate service account using platform logins and credentials. These are not user-specific authentications but instead apply to the platform itself. This comes with disadvantages. Most importantly, the user is unlikely to give global system access to their personal account, because this potentially exposes the user's personal account to other users of an AI agent with such global access. Therefore, without user-specific logins, many user-specific features of the providers cannot easily be utilized.

Attempts to move away from global authentications have encountered several pain points. For example, there is no easy way for users to manage their credentials on the AI platform. The users currently must log into the AI platform itself and add their credentials to the AI agent. That approach is cumbersome and also concerning to users, since other administrative users can access the AI agent on the AI platform and potentially expose the user credentials (e.g., username and password). Users can struggle to revoke authentications or re-authenticate and cannot add credentials without ending their AI agent session and going onto the AI platform.

As a result, there is a need for authentication of tools used with AI agents to be done in real-time for specific users of the AI agents, allowing users to securely utilize their own data through their own accounts.

SUMMARY

Examples described herein include systems and methods for just-in-time tool authentication for AI agents. The AI platform can include an agent executor that executes various agent objects included with an AI agent, including tools. The AI platform can provide a user interface ("UI") through which an administrative user can assign one or more tools to an AI agent. This can include navigating a menu or list of available tools and dragging those tools into contact with at least one agent object of the AI agent. For example, a tool for accessing an email account can be dragged into contact with an AI model, such that the email account can be searched and relevant results sent as inputs with prompts to an AI model. The tool can be set to user-based authentication rather than global or system authentication. This can allow the AI agent to utilize the user's personal accounts as tools with the AI agent rather than only using global system accounts that are not user specific. The overall flow between agent objects can be recorded in a manifest file that the AI platform generates. The manifest file can associate the tool with the agent object(s) and can specify user-based authentication for the tool.

The AI agent can be deployed for operation at an endpoint. The AI agent can operate with or without user input, depending on the AI agent and its purpose. When an input is received at the endpoint, the agent executor can execute the agent objects of the AI agent in a sequence defined by the manifest file. When an agent object is encountered that operates with a tool and/or when the tool is deemed necessary based on the input, the agent executor can check whether the user is authenticated for using the tool. This can include checking a credentials service, which can be part of or separate from the AI platform. The credentials service can be a process that manages user credentials and tracks active user authorizations. A schedule of user authentications can be maintained in one or more databases. The schedule can identify a tool, a provider ID, a user ID, user credentials needed for the authentication, an authentication status (e.g., active, expired), and an expiration date. In one example, the credentials service can also store active authentication artifacts for valid authorizations, allowing the AI platform to utilize the tokens on the user's behalf. An authentication artifact is a piece of data used to prove the user's identity, such as a session token.

When the credentials service indicates the user is not currently authenticated (e.g., the authentication artifact is invalid, expired, or nonexistent) with the provider of the tool, the agent executor can "pause" AI agent execution. This can mean not executing one or more agent objects involved in a task, such as a chat, search, or other operation, until the user authenticates with the provider of the tool. The agent executor can instead store a current state of the AI agent, which can include a conversation history, execution history, service account states of tools, data chunks from datasets that have been used by the AI agent, and any other information the AI agent had. The current state can be stored in a file.

The user is then prompted to authenticate with the provider of the tool. This can include sending a user-based authentication link through the web-socket when the AI agent is streaming or sending a message to the user when the AI agent is not streaming. The prompt can be presented in the AI agent window, such as in a browser or other client application, such that the user does not have to leave the interaction with the AI agent to authenticate. The agent executor can pass the authentication form to the user through use of a link or by requesting information needed to login on the user's behalf.

The agent executor can send a request to the end-user client to authenticate via link. If the credential is expired, the agent executor can send a request to the end-user client to authenticate by following a link. The authentication link can be a unique one-time URL associated with the agent execution. AI agent can pass the authentication form to the user through use of a link or by requesting information needed to login on the user's behalf.

In this way, a user authentication page can be accessed through a web-socket or from selecting a link in an AI agent message. The user authentication page can be a pop-up page. The authentication page can present a list of permissions for the user to grant to the AI platform for the use of the tool. When the user grants the permissions, the user can be redirected to the correct provider for the tool, where the user can then input the credentials (which can include selecting a method of authenticating rather than explicitly giving credentials). The agent executor or a separate server then makes an API call to the relevant provider with the authentication information. If the authentication is a success, user is shown a confirmation that the account has been authenticated after following the external link provided.

After authentication is completed, the credentials service can be populated with an authentication artifact (e.g., a token) received from the provider. The authentication artifact can be stored in association with the provider ID and the user's unique ID. The tool definition of the credentials service can likewise be updated to include the authentication artifact and an expiration date. The credentials service can utilize the expiration date in the future to determine when the user needs to authenticate again with the tool.

The agent executor can resume AI agent execution once the tool has been authenticated (or even if authentication fails, in which case the tool can be ignored). When the credentials service is updated with a valid authentication artifact, the agent executor can supply the file with the current status to the agent object. The credentials service can verify that the new authentication artifact is valid for the calling user ID based on a set of criteria. The AI agent execution can be resumed from the previous state.

The system can include an application programming interface ("API") endpoint to list all tools (or APIs) that the user has authenticated. The endpoint can be internal to the system. The endpoint can take in a user's unique ID, and return a list of the applications (e.g., tools) that the user has authenticated, along with a timestamp on the expiration of the authentications.

The API endpoint can allow the user to authenticate a credential using the user's unique ID. The endpoint can return a unique URL that authenticates or re-authenticates the credential for the calling user ID. This URL can be the same as the URL returned during AI agent execution of it.

The API endpoint can allow the user to revoke a credential. The endpoint can carry out an action to revoke the credential on behalf of the user. The system can also provide a self-service portal accessible from an AI agent where the user can view their authenticated credentials.

The credentials service can track both user-based and globally managed authentications, in an example. The UI of the AI platform can allow an administrative user to select how credentials are managed for a particular agent object for the AI agent. Users can be given access to a self-service portal for the user to manage their credentials on the client application.

The user can add a tool to the AI model of an AI agent, causing the UI to visually indicate the association. The UI can allow the user to drag the tool onto the AI model, forming the connection. This can indicate that the AI model should use outputs from the tool as inputs to the AI model.

AI models refer to the underlying machine learning models that power AI capabilities within a platform. These include large language models (LLMs) like GPT-4, Claude, or open-source alternatives like Llama; image generation models like DALL-E or Stable Diffusion; speech recognition models; and specialized models for specific tasks. In an AI platform context, these models are typically accessed via API calls, with the platform managing aspects like model selection, versioning, parameter configuration, and the orchestration of multiple models for complex workflows.

When adding a tool to a project, the user has the option to select user-based authentication. If a user does not select user-based authentication, the user will have the option to provide a credentials object (existing or new) to the tool. If a user selects user-based authentication, the user will not be asked to provide any credentials when saving the tool.

For existing tools added to project, associated credentials will be migrated to global-based authentication. The user can change this to user-based authentication.

After the AI agent is deployed, the user can interact with the AI agent. This can include sending an input to an endpoint where an agent executor executes the AI agent.

When the AI agent identifies a tool-based call, the agent executor can identify if the AI agent execution needs to be paused. This can occur if the current authentication to the tool is invalid, such as if the tool authentication is calling for a user identifier, if the authentication is expired, if the current authentication has incorrect permission scope for the tool, or the authentication does not currently exist.

The tool can also be another AI agent. During execution of an AI agent, routing decisions can be made to send inputs to another AI agent and receive outputs from that AI agent. This can be dynamic or hard coded. For example, a second AI agent can be incorporated into the workflow of a first AI agent, chaining them together. The AI platform can allow for adding other AI agents as agent objects to the first AI agent. In one example, a functional placeholder can be added to the flow of an AI agent. The agent executor or another AI platform process can select a second AI gent to execute in place of the functional placeholder when the second AI agent performs the function specified by the functional placeholder. The methods for authenticating a user with respect to a tool can therefore also encompass authenticating the user with respect to the second AI agent.

This system and method address the specific technical issue of how to provide user-based authentication for tools utilized by AI agents. The technical solutions discussed herein can reduce admin complexity of storing user-based authentication artifacts in shared projects. The system also strengthens data security by tying credentials to specific users and reduces time-to-authenticate by removing a requirement for end users to login to AI platforms.

Although the account authentication is referred to as "just-in-time," it is understood that an anticipatory authentication can occur prior to actual use of the tool. For AI agents that are not conversational but instead are scheduled processes, the agent executor can determine needed authentications in advance of that scheduled time (e.g., based on expiration dates of valid authorizations) and send an authentication message or page to the user device.

The examples summarized above can each be incorporated into a non-transitory, computer-readable medium having instructions that, when executed by a physical processor associated with a computing device, cause the processor to perform the stages described. Additionally, the example methods summarized above can each be implemented in a system including, for example, a memory storage and a computing device having a hardware-based processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is a flowchart of an example method for just-in-time tool authentication by an AI agent.

FIG. 4C is a UI for interacting with an AI agent that continues the interaction after user authentication.

DESCRIPTION OF THE EXAMPLES

Figure 2A:
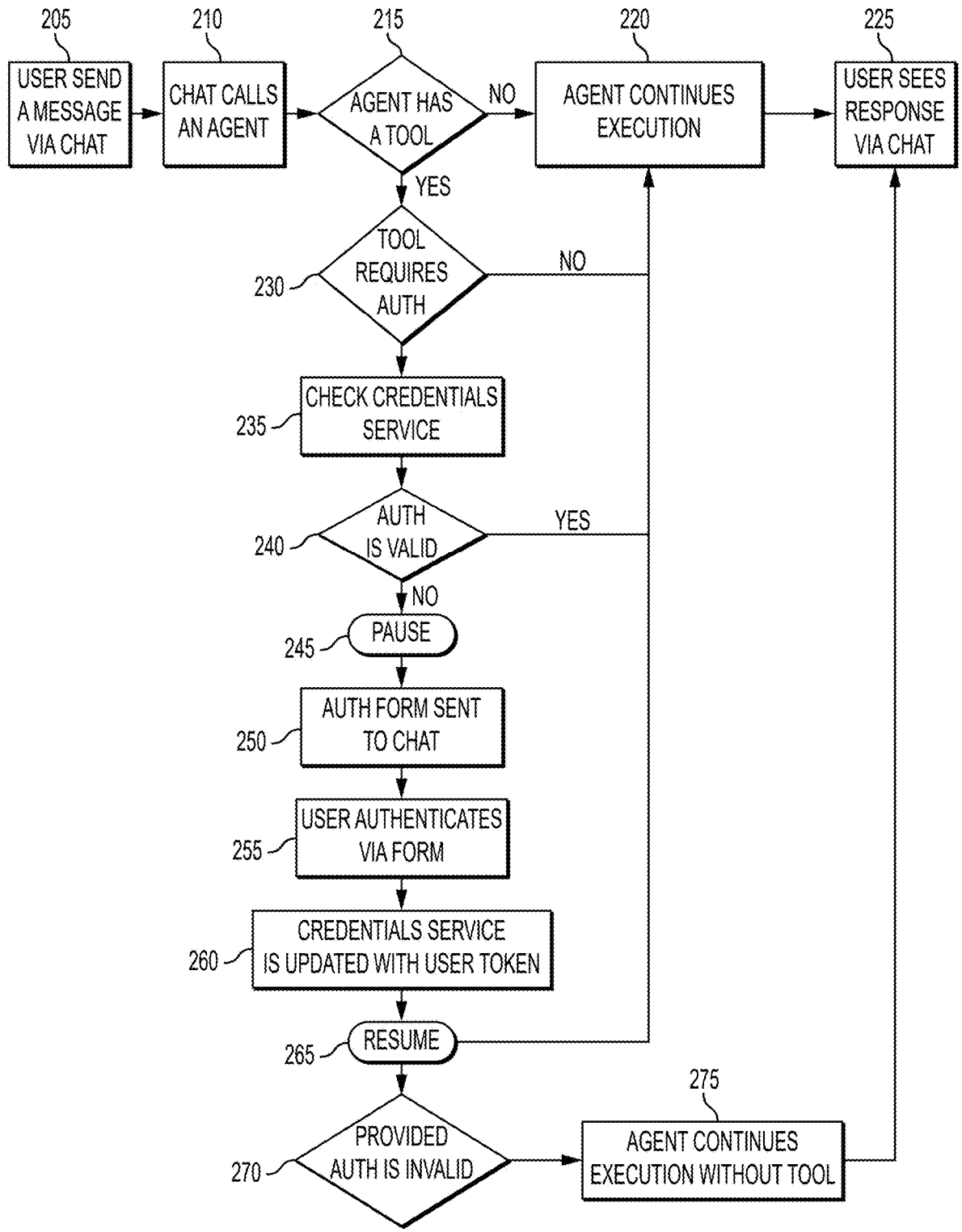
FIG. 2A is a flowchart of an example method for executing an agent with just-in-time tool usage.

Reference will now be made in detail to the present examples, including examples illustrated in the accompanying drawings. Wherever possible, the same reference numbers will be used throughout the drawings to refer to the same or like parts.

AI Agents are a configurable software system that performs tasks using artificial intelligence components to achieve specific goals. These agents can be backend-focused "AI Pipelines" processing data without user interaction, or user-facing "AI Assistants" providing conversational interfaces. AI Agents integrate various components (i.e., agent objects) including AI Models, Integrators, Data Sources, Tools, Prompts, Code Blocks, Datasets, Routers, Memory Objects, and others according to defined workflows and rules specified in their "Manifest Files."

An AI platform can allow users to create, modify, and deploy AI agents for execution. The AI agent can attempt to access various tools that can access user accounts. This can require user authentication.

FIG. 1 is a flowchart of an example method for adding just-in-time tool usage to an AI agent. This method can allow for adding user-authenticated tools to AI agents.

At stage 105, an administrative user can utilize an AI platform UI to define an AI agent that utilizes a tool. The UI can include menus of AI objects that the user can connect together to define the operation of the AI agent. Agent Objects are the modular components or building blocks that make up an AI Agent's functional capabilities. These discrete elements can be assembled, configured, and orchestrated to create complete AI workflows. Each Agent Object performs a specific function within the overall agent architecture, such as processing data, making decisions, storing information, or interacting with external systems. Agent Objects include AI Models (for intelligence and processing), Integrators (for connectivity), Data Sources (for information access), Tools (for actions), Prompts (for model guidance), Code Blocks (for custom processing), Datasets (for knowledge), Routers (for traffic management), Rule Enforcers (for governance), Memory Objects (for context retention), and various specialized systems like Knowledge Retrieval or Orchestration Engines. The modularity of agent objects enables flexible composition of AI Agents with varying capabilities tailored to specific use cases.

The user can select a first tool from a plurality of available tools on the UI. The user can assign the first tool to the AI agent, and specifically to an agent object of the AI agent. For example, the user can drag the tool onto an AI model or other type of agent object. This can connect the tool to the AI model (or other type of agent object) for operational purposes.

Assigning the first tool to the AI agent can include dragging or otherwise adding the first tool to a first agent object that is displayed on the UI. By selecting the first tool, the UI can display an options window for how the tool should operate with the first agent object. The option window can include an option for user-based authentication and an option for global authentication. The user can select user-based authentication, which will cause just-in-time functionality to be put in place for that tool. The AI platform need not require authentication of the user at that time of this setting but instead can request authorization as needed during AI agent operation.

The first tool can be any type of service for which the user has a personal account. To use it with another agent object, the tool can be executed, and an output can be supplied to the other agent object. For example, when the agent object, such as an AI model, is set to execute, the user input can be provided to the first tool. The tool can then output information that becomes an input to the agent object, such as the AI model. For example, the tool can be a notes application where the user takes notes. When the AI agent executes, the user input can include a query. The query can first go to the tool, in this case a notes application. The relevant notes can be output from the tool. Then the query and the relevant notes can be sent along with system prompts to the AI model. The AI model can then form a response based on the notes, the system prompts, and other knowledge of the AI model.

AI Models refer to the underlying machine learning models that power AI capabilities within a platform. These include large language models (LLMs) like GPT-4, Claude, or open-source alternatives like Llama; image generation models like DALL-E or Stable Diffusion; speech recognition models; and specialized models for specific tasks. In an AI platform context, these models are typically accessed via API calls, with the platform managing aspects like model selection, versioning, parameter configuration, and the orchestration of multiple models for complex workflows.

The tools can give access to personal user data sources, in an example. Data sources are authenticated connections to storage repositories and databases that the AI Agent's user is authorized to access. These include cloud storage services (like Google Drive, Dropbox), databases (SQL, NoSQL), knowledge bases, document management systems, and similar repositories. The AI platform manages OAuth authentication and permissions, allowing agents to securely access, read, and potentially write to these sources while respecting user permissions and data governance policies. When the user is authenticated, the provider can authorize use by issuing a token.

Tools are services that an AI Agent can use to perform specific actions or access specific functionalities. Unlike data sources that primarily provide information, tools enable the AI to take actions like sending emails, creating calendar events, querying APIs, or modifying data. Tools can be unauthenticated public services or authenticated through OAuth to act on behalf of the user. The platform typically provides a standardized way to discover, configure, and invoke these tools within workflows.

The UI allows the administrative user to define how the tool gets authenticated. For example, when the administrative user assigns the first tool to the AI agent (e.g., adding the first tool to a first agent object), the UI can then display an options window for the first tool. The tool can be listed as connected to the agent object, but the window can provide options for authenticating with the provider of the tool. The administrative user can select an option for user-based authentication instead of global authentication. This means the tool will utilize a user account instead of a global AI platform account, where applicable. But the administrator can select global authentication for other tools, or as a backup with the first tool cannot be authenticated for the specific user.

The administrative user can test (e.g., simulate execution) of the AI agent. When satisfied that the AI agent operates as intended, the administrative user can activate the AI agent for live usage, effectively deploying the AI agent to an endpoint.

Prompts are structured instructions or templates that guide the behavior of language models. In an AI platform context, prompts can be stored, categorized, and reused across different workflows. Prompt libraries allow organizations to standardize interactions with AI models, implement best practices, and maintain consistent outputs. Advanced platforms often include prompt management systems with versioning, performance tracking, and the ability to parameterize prompts for different use cases.

Code Blocks are executable Python environments within the platform that allow for custom data processing, transformation, or algorithmic operations. These blocks can run Python code to perform tasks that might be difficult to accomplish using pre-built components, such as complex data analysis, custom API integrations, or specialized business logic. Code blocks typically include access to common libraries and can interact with other platform components, allowing for powerful hybrid workflows that combine AI models with traditional programming.

Memory Objects are structured data representations that allow AI Agents to maintain contextual awareness and persistence across interactions. These objects store various types of information such as conversation history, user preferences, previously accessed data, intermediate computational results, and state information. Memory Objects can be short-term (session-based), long-term (persistent across sessions), or episodic (organized by interaction episodes). Advanced platforms implement different memory management strategies including summarization, prioritization, and forgetting mechanisms to handle memory constraints while maintaining context relevance. Memory Objects enable agents to recall previous interactions, build on past work, and provide personalized experiences based on historical context.

All of these different types of agent objects can be linked together to create custom AI agents on the AI platform. Tools can be linked to these agent objects. It is also possible for the authentication techniques described herein to apply to various agent object types and not just tools.

The AI agent can be activated for deployment, which can set a value at a key or value at an endpoint that an agent executor can associate with the AI agent. The endpoint can be monitored by a gateway service or by a platform service. When an input and corresponding key are received at the endpoint, the agent executor can execute the agent objects of the AI agent.

At stage 110, the AI platform service or a gateway can receive an input from a user device associated with a user. The input can be received at an endpoint associated with the AI agent. An agent executor can then execute one or more agent objects of the AI agent.

The user can be authenticated in one example. This can include using an integrator module to interact with an identify service. Integrator modules serve as a connection gateway between the AI platform and external services. It standardizes the way the platform interacts with various data sources and tools through APIs. The integrator handles authentication, data formatting, protocol differences, rate limiting, and maintains a consistent interface regardless of the underlying service being accessed. This abstraction layer allows users to focus on building workflows rather than dealing with the technical details of individual integrations.

AI agent execution can be described in a manifest file. The manifest file can identify the various agent objects, their dependencies and conditions, and the sequence in which they execute. The agent executor can utilize the manifest file in determining which agent object to execute next. Manifest files (also called "configuration files" or "agent manifests") are structured documents that formally define an AI Agent's composition and behavior. Typically written in XML, JSON, or YAML formats, these files specify the included Agent Objects, execution order and workflow sequencing, conditional rules governing operation, authentication details and permission scopes, and component parameter configurations. Manifest Files serve as both documentation and operational blueprints, enabling the Execution Engine to instantiate and run the AI Agent with consistent behavior across environments while facilitating version control of agent configurations.

At stage 115, the agent executor can determine that the AI agent needs to access the first tool as part of AI agent execution. This can include identifying the tool in the manifest file or using a tool selector for more dynamic tool invocation.

When the first tool is defined in the manifest file as user-based authentication, this means the first tool can require user authentication to execute properly. The manifest can alternatively indicate that the first tool utilizes global authentication, in which case the agent executor can supply system credentials as needed. Again, the distinction between a global authentication and a user-based authentication can be set on the AI platform in advance by an administrative user who designs or modifies the AI agent.

The first tool can invoke a service connected to a system or user account. The user account can be utilized when access is needed to the user's own personal data or information rather than a system account with a global login. Examples include a user's email account, a customer retention management account, a bank account, a social media account, a document or notes repository, or any other service in which the user maintains a personal or user-specific account.

As an example, the user could ask the AI agent to "draft an email for me addressing the PM team regarding tomorrow's presentation and place the email in a drafts folder in OUTLOOK." When executing this input into the AI Agent, multiple tools could be invoked. These can include a MICROSOFT Contacts tool to identify recipients of the "PM team." The AI agent can use context in writing the email content, such as from a content repository tool with data related to the presentation. Then, a MICROSOFT API or email tool can be used to save the email in the draft folder of the user. These tools can require user-specific authentication since they involve user-specific folders and services, although the content repository could be global authentication in an example. Alternatively, the user could ask "What am I forgetting today?" The AI agent can respond by invoking tools specific to reading emails and SLACK conversations to ensure that the user has met deadlines and responded to queries and requests. For example, a SLACK tool can include an API that allows for listing conversations and posting messages.

In one example, the AI agent includes a tool selector that allows the AI agent to use reasoning in determining which tools need to be invoked. The tool selector can determine which tools are relevant to a user input in generating an output by the AI agent. The tool selector can include one or more agent objects, such as code blocks, routers, or AI models, that analyze the input to determine which tools should be invoked. The potential usable tools can be limited to those defined on the AI platform for the AI agent, such as those that are included in the manifest file for the AI agent. But rather than attempting to use all of the available tools each time, the tool selector can ensure the invoked tool services are relevant to the input or output of the AI agent. For example, an input that requests "Find out from Jerry what caused the issue in dev this morning" could require a tool for accessing a messaging service. But an input that requests "Make a first draft of a POWERPOINT based on the attached email" could require a POWERPOINT tool, which can be an API.

The tool selector can include an AI model trained to identify tools relevant to inputs. Alternatively, a code block can parse an input into words, which are then used with a router object to determine which tools to invoke. For example, each route of the router can correspond to a different tool having its own keywords or semantic meaning associated with the route.

In one example, the input can be semantically compared against a vector database of example inputs. The example inputs in turn can be associated with one or more tools. The example inputs that exceed a threshold similarity with the input can then be used to identify which tools to apply to the input. The vector comparison can include vectorizing the input, then comparing the input vectors against the example input vectors of the vector database. The threshold similarity can be based on a difference in distance or angle between an input vector and an example input vector. Those input vectors that meet the threshold distance or angle similarity can then act as indices for retrieving identifications of the associated tools.

In another example, prompts can be stored at the AI platform that are utilized by the tool selector in determining which available tools should be utilized. For example, the tool selector can receive a list of tools that the user has approved for user-specific operation. The list can be provided by a credentials service, which will be discussed more in stage 120. With the list of tools (e.g., provider IDs), the agent executor can retrieve stored system prompts associated with those provider IDs. Then the agent executor can supply the input and the retrieved prompts to an AI model (e.g., an LLM) to assist in determining which tools are relevant for use with the input. In this way, the first tool can be associated with a first prompt for determining whether to use the first tool based on the input. That first prompt can be retrieved and sent with the input to the AI model. The output from the AI model can indicate whether to use the first tool with respect to the input.

At stage 120, the agent executor can contact a credentials service to determine if a valid authorization exists for the user to use the first tool. The agent executor can check with the credentials service prior to invoking the first tool, such as through an API call or by notifying an integrator.

The credentials service can be maintained by the AI platform in an example. One or more user authentication statuses can also be maintained by a separate third party. The credentials service can include one or more processes for tracking user authorization to use various tools, including a database that tracks the authentication status of users at various tool providers. This can include a table that contains a provider ID, a user ID, an authentication status, and an expiration date.

To check with the credentials service to determine if a valid authorization exists, the agent executor can send the user ID and/or provider ID to the credentials service. If the user ID and provider ID are sent, the credentials service can return the authentication status and expiration date to the agent executor for tool associated with the provider ID. Different provider IDs can correspond to each tool in an example. Alternatively, a single provider ID can correspond to multiple tool IDs, in which case the agent executor can optionally send the tool ID. For the purposes of this disclosure, the provider ID is understood to apply to either a provider or a specific tool of the provider.

In one example, the credentials service also stores the user credentials for the provider ID in an encrypted format. When a valid authorization exists, the stored credentials can be used to access the tool without further prompting required of the user. For example, the agent executor can receive the credentials and make an API call to the provider to access the tool. Alternatively, the credentials service can make the API call on the agent executor's behalf, utilizing the stored credentials.

The lack of a valid authorization can be indicated by the credentials service, such as when no entry exists for the user and the particular provider ID, or when the entry indicates that the authorization is expired. Alternatively, when the agent executor attempts to authenticate at the provider using stored credentials of the user, the provider itself may return a message indicating that the authorization is not valid.

In one example, checking authorization with the credentials service includes contacting a second API endpoint of the credentials service (different than the provider of the tool). The API can provide a list of all available tools with which the user has been authenticated. The list can include expiration times for at least one currently authenticated tool. The list can also indicate one or more tools for which the user will need to authenticate prior to use.

At stage 125, in an instance in which a valid authorization does not exist for the user to use the first tool, the agent executor can pause execution of the AI agent, which just means refraining temporarily from execution the AI agent. During the pause, the agent executor can attempt to gain a valid authorization to the first tool, prior to executing an agent object that relies on tool access or output. For example, if the agent object is an AI model, the agent executor can abstain from sending an input to the AI model prior to seeking authorization from the first tool that the manifest file and/or the tool selector indicates can be used with the AI model.

As part of pausing execution, the agent executor can store a current state of the AI agent. This can include noting where within the manifest file the execution has been paused, such as by recording a timestamp and the agent object ID from the manifest file. Additionally, history and context of the AI agent can be stored in a file, such as a database or dictionary. This can include writing a string to a file that includes the AI agent conversation history. The conversation history can include messages and context. The context can include things like which tools have been used, which dataset chunks have been used, and any other information that the AI agent previously had access to.

By storing the history and context, the agent executor can later restart the AI agent at the same state as where it was when paused. For example, once the tool authorization has been resolved, the agent executor can access the stored current state and retrieve the historical tool IDs (i.e., provider IDs), and re-check the user authorization for those tools. Likewise, the agent executor can retrieve and supply the historical conversation and chunks back to the same AI model that helped facilitate the conversation through use of the chunks. This can ensure that actions of the AI agent can be resumed at the pause point, even if an AI model or other agent object involved in the AI agent operation clears its history based on the pause. In essence, by storing the current state, the agent executor bypasses issues that could arise based on caching settings of the agent objects that are no longer executing during the pause.

A similar process can take place for non-conversational AI agents that perform a scheduled task. For example, the agent executor can cause the user to authenticate prior to the scheduled task that relies on a tool.

At stage 130, the agent executor can prompt the user for credentials for the first tool. The prompt can be a popup window or can appear as part of regular conversation with the AI agent, such as in in the same UI. The prompt can include a message regarding the need for credentials and identifying the tool and/or provider.

In one example, the prompt can include a button for the user to authorize authentication with the provider of the tool. This can be based on stored user credentials (e.g., at the AI platform and/or credentials service), or the user can supply the credentials in fields included with the prompt. The prompt can be displayed in the UI provided by the user device, such as in a browser or other client application.

When the user submits the authorization and/or credentials, at stage 135, the AI platform can attempt to authenticate the user with a provider of the first tool using the credentials. This can include making an API call, such as by the agent executor, to the provider associated with the first tool. The AI platform or credentials service can track addresses for sending the credentials as part of authenticating with the provider of the first tool. The API call can be made to a first API endpoint, which returns a unique address to use for authenticating the credentials.

Based on whether the supplied credentials are valid, the provider can respond with a message indicating the user is now authorized to use the tool. Otherwise, if no message is received or if the message indicates the credentials are invalid, At stage 140, the agent executor can update the credentials service to reflect the authentication with the first tool. This can include indicating that a valid authorization exists, or does not exist, depending on the current state of authorization. In one example, the credentials service or agent authenticator can also store the authentication artifact for future access. Authentication artifacts can include session tokens, access tokens, authentication cookies, bearer tokens, JSON Web Tokens ("JWTs"), Security Assertion Markup Language ("SAML") tokens, OAuth tokens, refresh tokens, and client certificates.

Updating the credentials service can include sending the credentials to the credentials service for storage in association with a provider identifier of the first tool and a user identifier of the user. Again, this can be stored as part of the AI platform, in an example. This can allow the AI platform to submit the credentials on behalf of the user as part of utilizing the first tool during the AI agent operation that occurs on the user's behalf.

At stage 145, the agent executor can resume execution of the at least one agent object of the AI agent based on the stored current state. The goal here is to resume agent operation at the stored current state. If user authorization was obtained for the first tool, the agent executor can resume execution by executing an operation with the first tool. This can include providing one or more inputs to the first tool from the history of the stored current state.

The agent executor can restore the state of the AI agent by reading the stored file. The historical messages and context can be sent to the AI model to ensure the AI model context is restored as well. The AI model can, in some instances, provide an output for use as an input to the first tool.

The first tool can provide an output that is utilized by the AI agent in executing an additional agent object, such as continuing a conversation that utilizes an AI model. For example, a file storage tool can access one of the user's personal files and supply it as an input to the AI model. Alternatively, a scheduling tool can be used to update a user's calendar, and the new calendar entry can be provided as an input to the AI model.

Authenticating the user can include sending the credentials to a first application programming interface ("API") endpoint for the provider. Additionally, the authenticating the user can include redirecting the user to a login screen for the provider.

If the agent executor was unable to authorize the user with the tool provider in the prior stages, then the agent executor can attempt to execute the agent object without access to the tool.

Additionally, other tools can be utilized with respect to the same or different agent objects of the AI agent. These tools can be user-specific or globally authenticated. For example, whereas the user can be authenticated with a provider for with the first tool, the agent executor can supply a global credential to authenticate an AI platform with the second tool.

At stage 150, the agent executor can provide an output to the user device based on execution of the at least one agent object, wherein an output of the first tool is used as an input to the at least one agent object. The output can convey the action taken by the AI agent, in an example, which includes indicating what was done with the first tool.

FIG. 2A is a flowchart of example steps for executing an AI agent with just-in-time tool usage. In this example, the AI agent is conversational, such that the user can chat back and forth with the AI agent. At stage 205, the user sends a message through a chat application to the AI agent. For example, the AI agent can be a user within the chat application, listening for messages at an endpoint. Alternatively, the chat application can have one or more designated AI agents that the user can converse with by using the name of the AI agent or selecting to converse with the particular AI agent. The user can send a message using the client application, with a UI that executes on the user device.

At stage 210, a server associated with the chat application can receive the message and direct it to the AI agent. This can include an API call to the AI agent or routing the message to an endpoint associated with the AI agent. Upon receipt of the message at the endpoint, the agent executor can execute the AI agent, utilizing the message as an input.

At stage 215, the agent executor can determine that the AI agent is configured to utilize a tool. To do this, the agent executor can read the manifest file of the AI agent and identify the tool.

In another example, the agent executor executes a tool selector that determines whether the AI agent needs to use a tool based on the message. The tool selector can be an agent object or a second AI agent with which the AI agent communicates. Executing the tool selector can cause the agent executor to request and receive a list of available tools. The list can be received from the credentials service in one example, such as by the agent executor supplying the user identifier associated with the message. The list can include all tools authorized for use by the user. Alternatively, the list can be limited to particular provider identifiers that correspond to the tools assigned to the AI agent.

The tool selector can utilize an AI model in one example to determine if a tool is needed. The list can be provided as an input to the AI model, along with the message and system prompts. The system prompts can be selected based on the specific available tools for the user and AI agent, guiding the AI model with determining whether the message indicates a need to use any of those tools.

If the AI agent is not configured to use a tool, then at stage 220 the AI agent continues execution. The agent executor can execute one or more agent objects defined in the manifest file. This can include sending an output to the user device, which can display in the UI to the user at stage 225 as a response in the chat.

If the AI agent is configured to use a tool, then at stage 230 the agent executor can determine whether the tool requires authorization. This can include determining that the tool utilizes user-specific authentication versus global authentication. If the tool uses global authentication, the agent executor can apply the global credentials of the AI platform as needed. However, if the tool is set to user-specific authentication, then the agent executor can perform just-in-time authorization.

At stage 235, the agent executor checks the credentials service to see if the user has a valid authorization to use the tool. This can include looking up the current authorization using a provider identifier for the tool and the user identifier associated with the user. The authorization status is returned. In one example, the credentials service receives the user identifier and returns a list of all authorizations for the user, which can include the provider identifiers of all tools associated with the user. The agent executor can then use the provider identifier of the tool to identify the authorization validity.

At stage 240, the agent executor determines whether the authorization is valid. This can also include ensuring that a valid authorization has not expired, such as by receiving an expiration date from the credentials service.

If the user authorization is valid, then the agent executor can execute the tool and continue executing the agent objects at stage 220. If the user authorization is not valid, then the agent executor can pause execution of the AI agent at stage 245.

Pausing execution of the AI agent can include storing the current state of the AI agent, which can include message history, prior tool usage, information regarding other AI agents contacted, datasets accessed, and content chunks used with AI models. The agent executor can store this information in a file, such as a dictionary or database.

At stage 250, the agent executor can cause an authentication form to be presented in the UI of the user device. The form can appear in the chat window in one example. If the AI platform already has the user credentials, the form can simply ask the user permission to authenticate with the provider of the tool. Otherwise, the form can also include input fields for the credential or links to use other services to authenticate the user, such as GMAIL or APPLE. The user can authenticate by submitting the form at stage 255.

In response, the agent executor can receive a token (or other authentication artifact) from the provider for use with executing the tool.

At stage 260, the credentials service can be updated with the user token (or other type of authentication artifact) received based on authenticating the user. The credentials service can store and use this token on the user's behalf so long as the token remains valid. The expiration date of the token can likewise be stored at the credentials service so that the agent executor or credentials service can recognize when the user needs to authenticate with the provider of the tool again.

At stage 265, the agent executor can resume execution of the AI agent. This can include restoring the current state by accessing the stored file and supplying the state information to an AI model used by the AI agent. For example, this can ensure that the AI model remembers the conversation history and the context of that conversation.

At stage 220, the agent executor can continue executing the AI agent. The AI agent can continue to converse, with a response being sent to the UI shown at the user device at stage 225.

However, if the attempt for just-in-time authentication fails due to wrong credentials or the user declining to authenticate, then at stage 270 the authentication can be determined to be invalid. In response, at stage 275, the agent executor can attempt to continue executing the AI agent without the tool. A response can be sent to the user device at stage 225, indicating this.

Figure 2B:
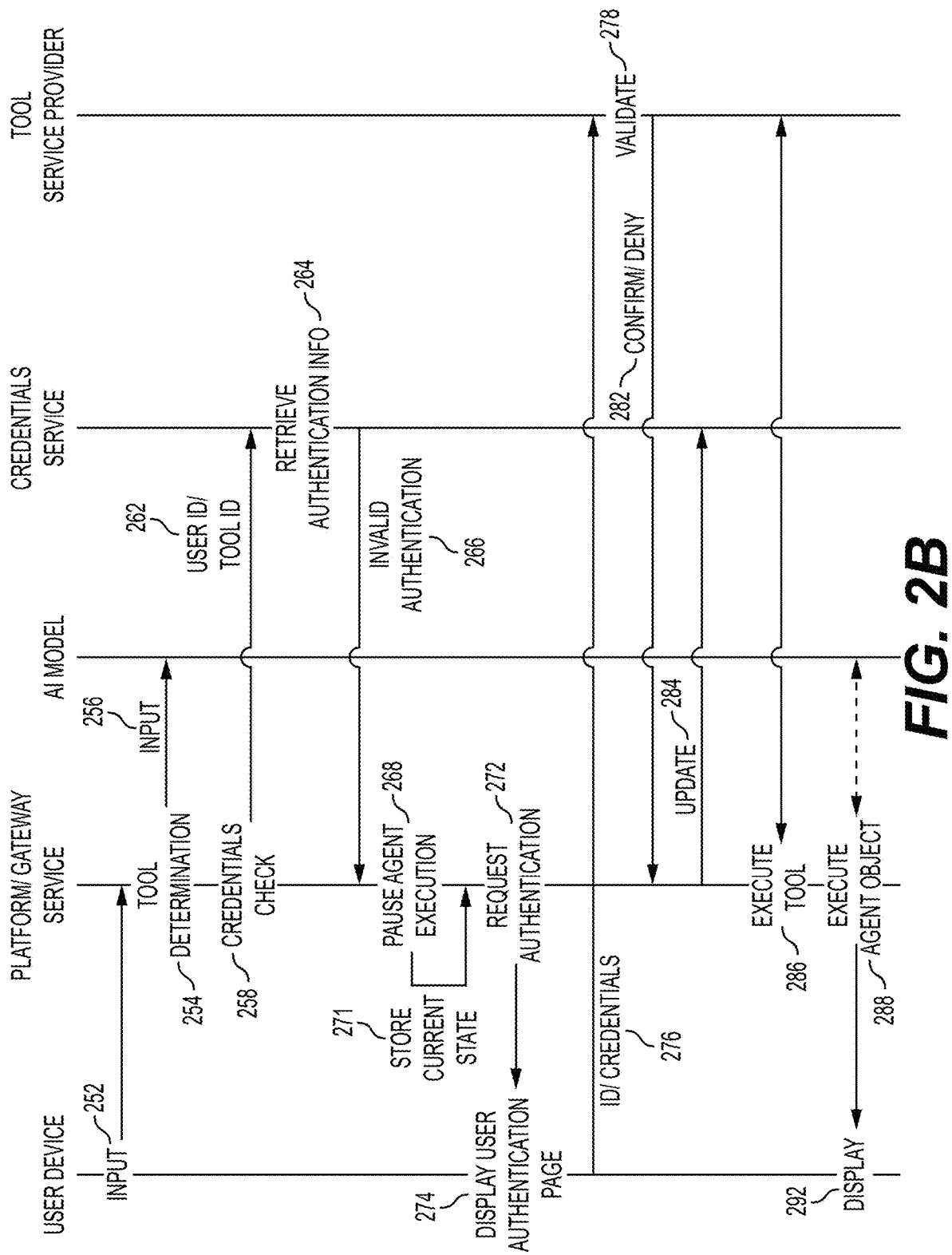
FIG. 2B is a sequence diagram of example stages for executing an agent with just-in-time tool usage.

FIG. 2B is a sequence diagram of executing an AI agent with just-in-time tool usage. At stage 252, the user device can send an input to an endpoint associated with an AI agent. The endpoint can be the location of a platform or gateway service where an agent executor executes. The input can include a key, token, and/or user identifier that allows the agent executor to validate the input for use with the AI agent. The agent executor can then execute the agent objects of the manifest file for the AI agent, utilizing the input as described by the manifest file.

At stage 254, the agent executor can determine if any tools are available for use with the AI agent. These can be specified in the manifest file in one example. Alternatively, a user management profile of the AI platform or list from the credentials service can indicate which tools are available to the user who submitted the input. The manifest file can indicate which tools are set to user-specific authentication versus global authentication. User-specific authentication can be performed just-in-time based on information stored with the credentials service.

In one example, a tool selector can utilize an AI model to determine which of the available tools can assist in handling the input. To tool selector can be executed by the agent executor, and can send the input at stage 256 along with system prompts to an AI model. The AI model can indicate which tools are relevant to the input.

At stage 258, the agent executor can perform a credentials check by making a request, such as an API call, to the credentials service. At stage 262, the request can include at least one of a user identifier and tool identifier (i.e., provider identifier). The credentials service can be operated by the AI platform as a separate process from the agent executor, or alternatively can be a third-party service. In one example, the credentials service is a separate AI agent responsible for tracking user-specific tool authorizations. In that example, the credentials service can execute as a second AI agent that communicates with multiple instances of AI agents, receiving requests and also notifying AI agents when a valid authorization expires.

At stage 264, the credentials service retrieves authentication information for the available tools with respect to the user. The user identifier can allow the credentials service to search a database of credentials to determine which tools are available to the user and which ones of those tools already have a valid user authorization. For tools with a valid authorization, the credentials service can return an expiration date and a token to use on the behalf of the user in executing the AI agent. These are tools that the user has previously authenticated for personal use. Some other tools can be set to global authentication. For those tools, the credentials service need not return user-specific authorization information.

At stage 266, the information returned from the credentials service to the agent executor can indicate one or more invalid authentications for available or needed tools. For those tools, just-in-time user authentication is needed.

At stage 268, the agent executor can pause execution of the AI agent for purposes of attaining valid user-specific authorization with the provider of the tool. This can include, at stage 271, storing a current state of the AI agent in a file. The current state can include interactions with one or more agent objects, such as message histories, search histories, chunk access from datasets, tool usage, and the like.

At stage 272, the agent executor can request authentication from the user with respect to the tool. This can include causing a page to display at the user device at stage 274 with a button or other option for the user to authorize the use of the tool by the AI agent. If the AI platform does not already have the user's credentials, then the page can prompt the user to enter those credentials (e.g., username and password). Authorizing the login can cause the user identification and credentials to be sent from either the user device or the AI platform to the service provider of the tool at stage 276. This can be an API call to a server, in one example, to a known authentication address for the service provider.

At stage 278, the service provider can validate the user credentials and respond by confirming or denying authorization of the tool at stage 282. If the user credentials are correct and the user has the requisite permissions with the service provider to use the tool, then the response at stage 282 can include a token for use in interacting with the tool. The token can be received by the agent executor or the credentials service. At stage 284, the credentials service can be updated, which can include indicating the valid authorization and storing the token for use by the AI platform in user interactions with the tool performed as part of executing the AI agent.

At stage 286, the agent executor can execute the tool. This can include supplying the token to an endpoint associated with the tool. The input from stage 252, user identifier, or other data output from a different agent object of the AI agent can be used as inputs to the tool. The output of the tool likewise can be used as an input to one or more agent objects that are executed at stage 288.

At stage 288, the agent executor can continue executing agent objects of the AI agent, as specified in the manifest file.

In some cases, while execution takes place, the credentials service can notify the AI agent in an instance in which the token has expired, triggering reauthentication of the user with the provider. The AI agent can have the same or different endpoint used for receiving these notifications. When the AI agent is executing an agent object that utilizes the tool, then the notification can cause the AI agent to repeat stages 268-284.

At stage 292, an output can be sent from the gateway or platform service to the user device, displaying in the UI of the user device.

Figure 3:
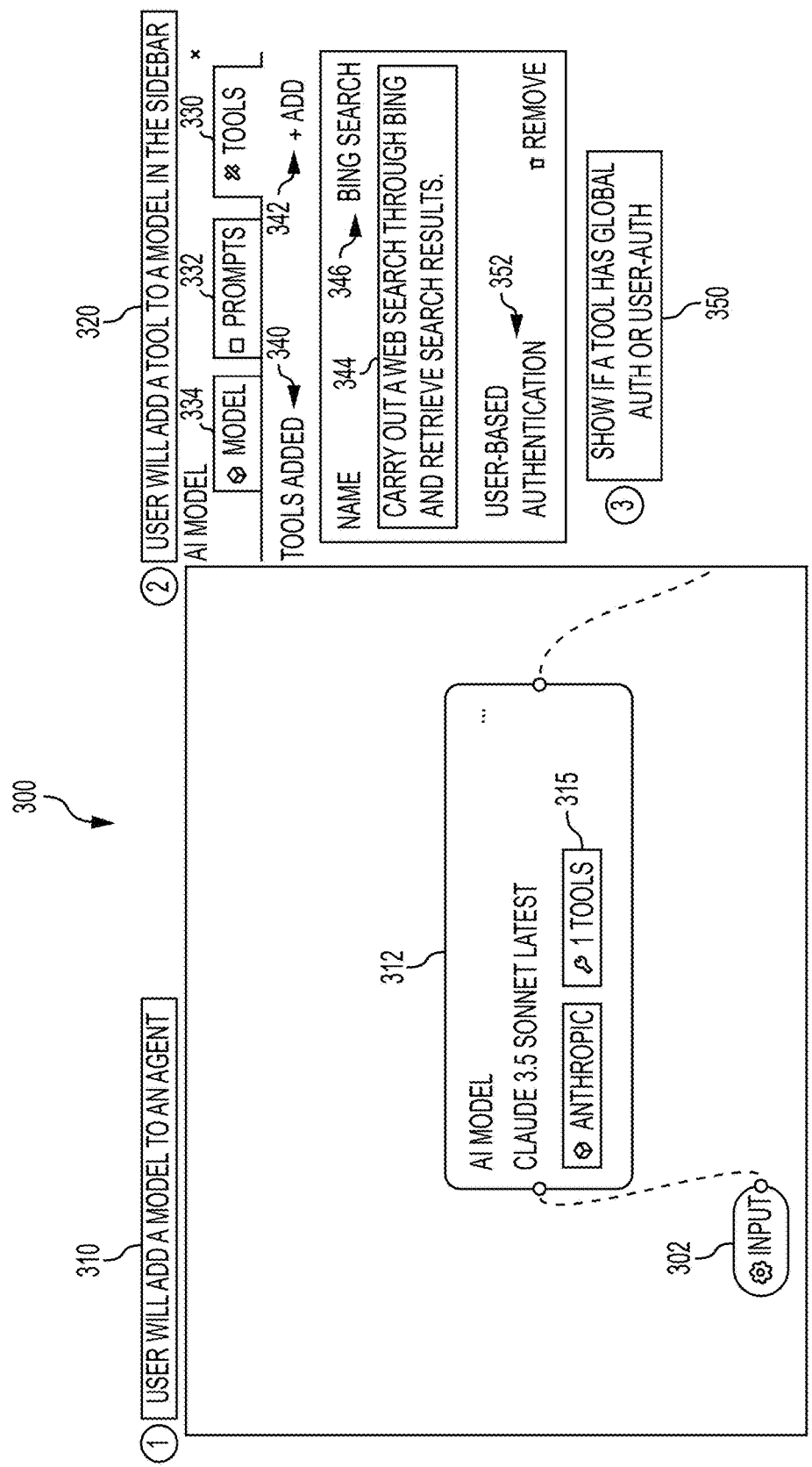
FIG. 3 is an example user interface (UI) screen for adding a tool with user-based authentication to an AI model of an AI agent.

FIG. 3 is an example UI screen 300 for adding a tool with user-based authentication to an AI model of an AI agent. This UI screen 300 can be accessed, for example, by an administrative user who is creating or modifying the AI agent on the AI platform. In this example, two stages of the AI agent are shown. The first is an input stage 302, which represents a starting point of the AI agent upon receiving an input at a designated endpoint. The second is an agent object specifically, an AI model 312. This AI model 312 can be added to the AI agent in step 1, stage 310. This can include selecting the AI model 312 from a menu or dragging it into the area of the UI where the AI agent is being assembled.

Next, at stage 320, the user can add a tool to the AI model 312. In this particular example, selecting the AI model 312 causes an options window (in this case, a sidebar) to display, with folder tabs 330, 332, and 334. Tab 334 allows the user to make selections regarding the AI model itself. For example, the user can select CLAUDE 3.5 SONNET by ANTHROPIC from amongst available LLM options. Various settings available for CLAUD 3.5 SONNET can then display in the sidebar, allowing the user to customize how the LLM will operate during use by the AI agent. The UI also visually indicates that the tool is added to the AI model 312, such as by field 315.

Tab 332 allows the user to view and modify system prompts that the AI agent will use with the AI model 312.

Tab 330, which is selected in this example, causes the sidebar to display an option 342 for adding tools for use with the AI model 312. A list of tools added 340 can be presented. In this example, a tool called BING search 346 has been added to the AI model. This is the lone tool added so far in FIG. 3, which is also reflected in a tool count field 315 on the icon for the AI model 312.

In addition, tool-specific prompts for use by the AI model 312 or agent executor can be displayed in field 344. In this example, field 344 includes the instruction "Carry out a web search through BING and retrieve search results." This can allow the AI model 312 to utilize a BING search in responding to a query.

When the tab 330 is selected, at stage 350 the sidebar can display whether the tool is configured for global or user-specific authentication. In this example, option 352 displays as "User-based authentication." This means that for the BING search, the user's own account can be utilized, making the search more specific to the user rather than a global account, which would not know the user's personal history and preferences on BING.

In this way, the AI agent can be configured to use a first tool, BING search 346, with an AI model 312, CLAUDE 3.5 SONNET by ANTHROPIC. The administrative user can save changes and set the AI agent as active. The AI platform can automatically update the manifest file to reflect the settings and changes made in FIG. 3. Additional agent objects or simply an output, hidden by the sidebar in FIG. 3, can also be included in the manifest file. The agent executor can utilize the updated manifest file in executing the AI agent when an input is received at the relevant endpoint.

Figure 4A:
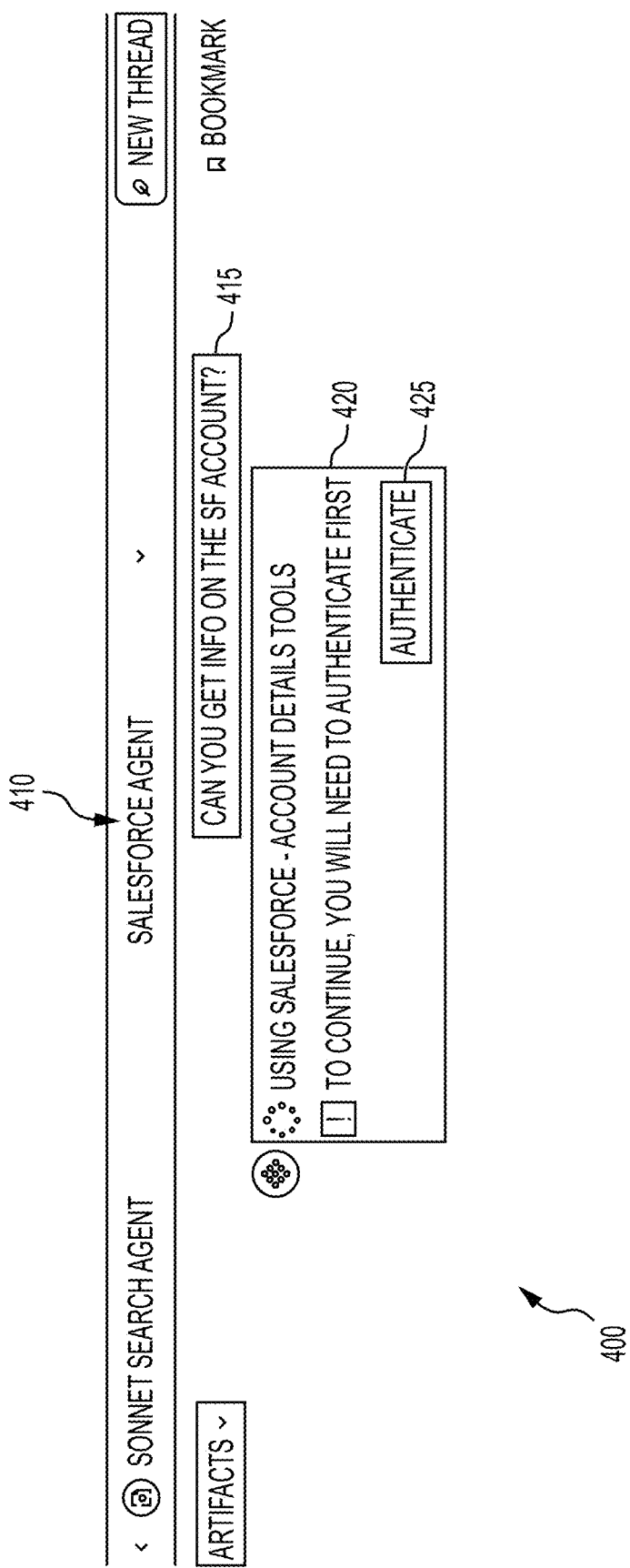
FIG. 4A is a UI for interacting with an AI agent that utilizes a tool for which the user is not yet authenticated.
Figure 4B:
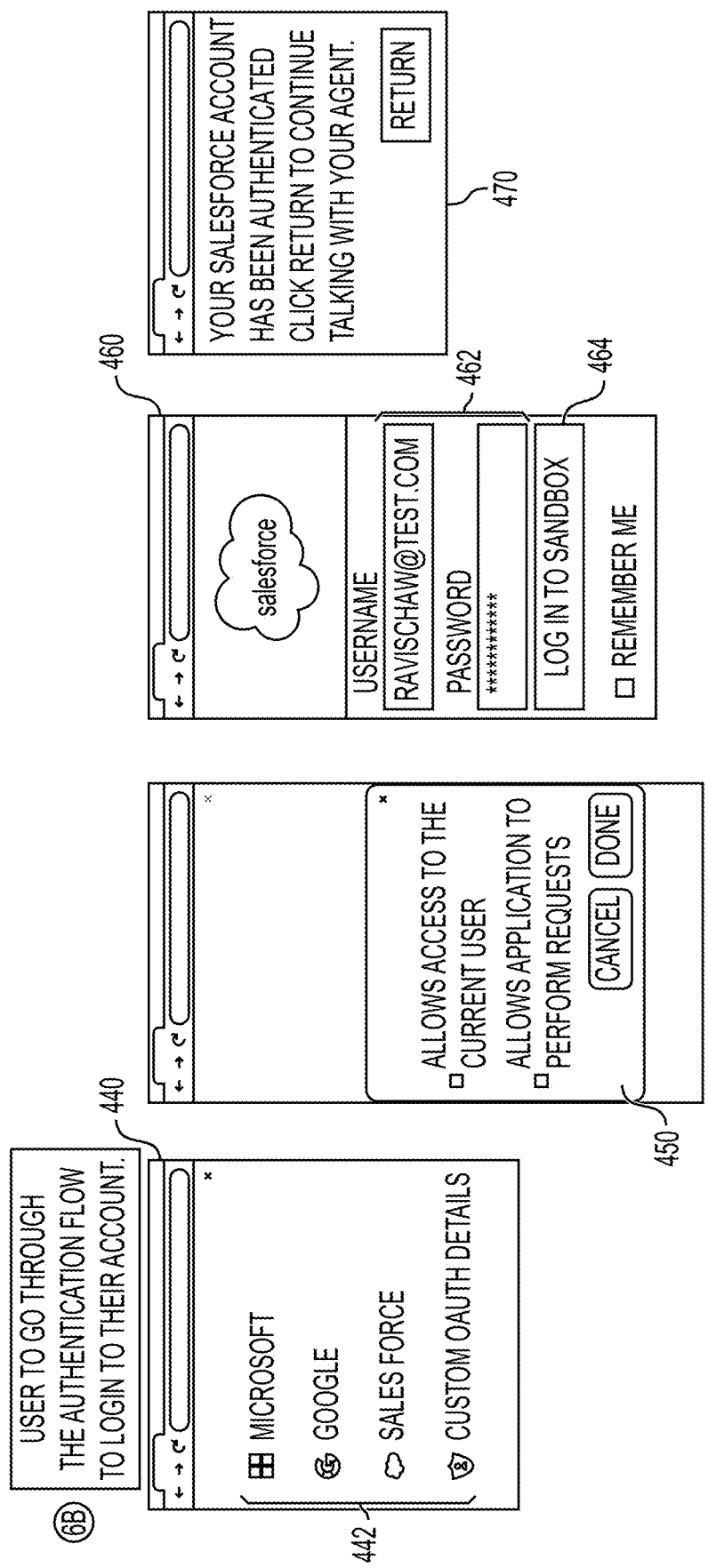
FIG. 4B is a UI for interacting with an AI agent that presents user authentication forms.

FIG. 4A is a UI for interacting with an AI agent that utilizes a tool for which the user is not yet authenticated. In particular, FIGS. 4A, 4B, and 4C illustrate an example sequence of events in just-in-time authentication from the perspective of a UI on the user device.

In FIG. 4A, the UI 400 shows a chat screen with an AI agent called SALESFORCE AGENT 410. The user can select between AI agents in one example, with SALESFORCE AGENT 410 being the current selection but SONNET search agent being another. This custom AI agent can manipulate the user's entries in a SALESFORCE application on behalf of the user, based on the user simply chatting with the AI agent.

FIG. 4A also can illustrate an example of agent-to-agent communication. In this example, the user can be chatting with SONNET search agent. When the user sends a message 415 to SONNET search agent, this AI agent can determine that SF stands for SALESFORCE, such as by gaining context from a tool that allows access to the user's email. The SONNET search agent can then attempt to utilize a second AI agent, SALESFORCE agent, and receive outputs from that AI agent. This relationship between the two AI agents can be dynamic or hard coded. For example, a second AI agent can be incorporated into the workflow of a first AI agent, chaining them together. The AI platform can allow for adding other AI agents as agent objects to the first AI agent. In one example, a functional placeholder can be added to the flow of an AI agent. The agent executor or another AI platform process can select a second AI gent to execute in place of the functional placeholder when the second AI agent performs the function specified by the functional placeholder. The methods for authenticating a user with respect to a tool can therefore also encompass authenticating the user with respect to the second AI agent.

The functional placeholder comprises a specification of a type of function that the AI agent should execute at runtime. Unlike a typical agent object, the functional placeholder need not identify the exact code or service provider involved in executing the function but instead includes rules (object selection and execution rules) that the agent executor or rules engine can use to select an agent object. Instead, the functional placeholder identifies a function type, such as personally identifiable information ("PII") redaction. The agent executor identifies management rules associated with the AI agent. The management rules include an object selection rule and an execution rule associated with the functional placeholder. In one example, the functional placeholder can identify the management rules.

The agent executor can identify a set of functionally capable objects accessible to the AI agent. These can be agent objects having the function type specified by the placeholder object. The agent executor then evaluates the set of these agent objects to determine which of the agent objects should be used. The agent executor selects an agent object (which could be another AI agent) from the set based on an evaluation of the object selection rule and the execution rule associated with the functional placeholder. For example, an object selection rule can be a selection cost rule, which includes rules around monetary cost and/or execution performance impact. An execution performance impact rule can compute performance cost rule, a memory performance cost rule, and/or a network performance cost rule. The selection cost rule can include infrastructure impact rules.

The object selection rules can also include a risk rule or a compliance rule. The selection risk rule can include a trade compliance risk rule, a cyber security risk rule, and a sensitive data risk rule. These risk rules can be used to ensure that a selected agent object accounts for the risk prevention a tenant has in mind for the AI agent. The object placeholder can also include one or more object compliance rules. The object compliance rules can be used to ensure the selected agent object meets terms of service for the AI platform or other agent objects in the AI agent. The object compliance rules can also be set to ensure rules of the AI agent, such as data loss prevention ("DLP") rules, are enforced by whichever agent object is selected to fill the object placeholder. These object selection and compliance rules can include maximum or minimum thresholds and can be compared to technical information of the agent objects in the set. An agent object that best meets the various object selection and execution rules can be selected by the rules engine.

In one example, the UI can allow an administrator to supply weights on the object selection and execution rules. Therefore, similarly to generating a remediation score, agent executor can generate a selection score for each the agent objects in the set. The agent object with the best (e.g., highest) selection score can be selected to operate in place of the functional placeholder.

The agent executor can cause the selected agent object to be executed in accordance with the at least one execution rule. The selected object is executed in place of the functional placeholder during the execution of the AI agent. The execution rules can guide how and when the selected object executes. One example execution rule is an execution scheduling rule. This rule can cause the selected object to be executed at a particular day and time. The execution scheduling rule can alternatively prohibit a period or day. This is because resource availability and cost can shift throughout the course of the day, meaning the execution timing can be associated with different costs. Additionally, for an AI agent that must execute quickly (e.g., a conversational agent), the execution rule can help ensure that the selected object does not cause unacceptable delay. Another type of execution rule is a deployment rule, which can specify where a selected object can or cannot be executed. The execution deployment rule can include an indication of at least one geographic location where execution of the functional placeholder is permitted.

Responding message 415 can require user-specific use of one or more tools. For example, the AI agent might not even know that SF stands for SALESFORCE, and might utilize a tool (such as a MICROSOFT tool for email access) to determine the user's intended meaning of SF by way of analyzing user emails or texts for context around the user's use of SF. But once the AI agent knows SF means SALESFORCE, then the AI agent will need to utilize a tool to access the user's SALESFORCE account and get the information that the user is requesting. A global authentication with SALESFORCE will not accomplish the goal.

In one example, the tools at the AI agent's disposal can be predefined and can include tools by providers tracked by the credentials service. The predefinition can be specific to either the AI agent or to the user. For example, the user can allow all of its AI agents to communicate with one another as tools. A functional placeholder can be included in the definition of the AI agent, allowing the agent executor to determine which of the user's available tools to use in place of that functional placeholder, in an example. The SALESFORCE agent can be one such tool, operating as its own AI agent.

In one example, the agent executor and/or tool selector can identify the SALESFORCE tool as necessary based on either the input message 415 or the agent manifest, and request authentication information from the credentials service. The credentials service can in turn indicate that the user does not currently have a valid authorization from the provider, SALESFORCE.

As a result, the agent executor can cause page 420 to be presented in the UI 400. Page 420 can request user-specific authentication, which the user can elect to perform by selecting the authenticate button 425.

FIG. 4B is a series of UI screens for authenticating with an AI agent. In FIG. 4B, various presents user authentication forms 440, 450, 460, and 470 are presented. Form 440 allows the user to select which method of authentication 442 they prefer. This can include authenticating based on the user's existing MICROSOFT, GOOGLE, or SALESFORCE accounts, any of which can be used as valid authentication with SALESFORCE. Alternatively, the user can supply custom authentication details, such as login information.

Based on the selection, form 450 is presented. Form 450 simply informs the user what the AI platform intends to do with the user's authentication token once authentication is achieved. The user can elect to cancel or continue, by selecting "Done."

Next, form 460 is presented with a user login request from SALESFORCE. The user inputs credentials into username and password fields 462, selects to log in with button 464, and can elect to be remembered.

Form 470 then shows the user that the SALESFORCE account has been authenticated. When the user selects "Return," the agent executor can unpause and resume operation of the AI agent.

FIG. 4C is a UI for interacting with an AI agent that continues the interaction after user authentication. The chat is updated with a first output 480 from the AI agent that reflects it is using the SALESFORCE tool, and that the user's account is authenticated. This can be based on an output from the agent executor in response to the successful authentication.

The AI agent can likewise output a second output 490 from the AI agent that responds to the user's message 415 based on usage of the tool.

Figure 5:
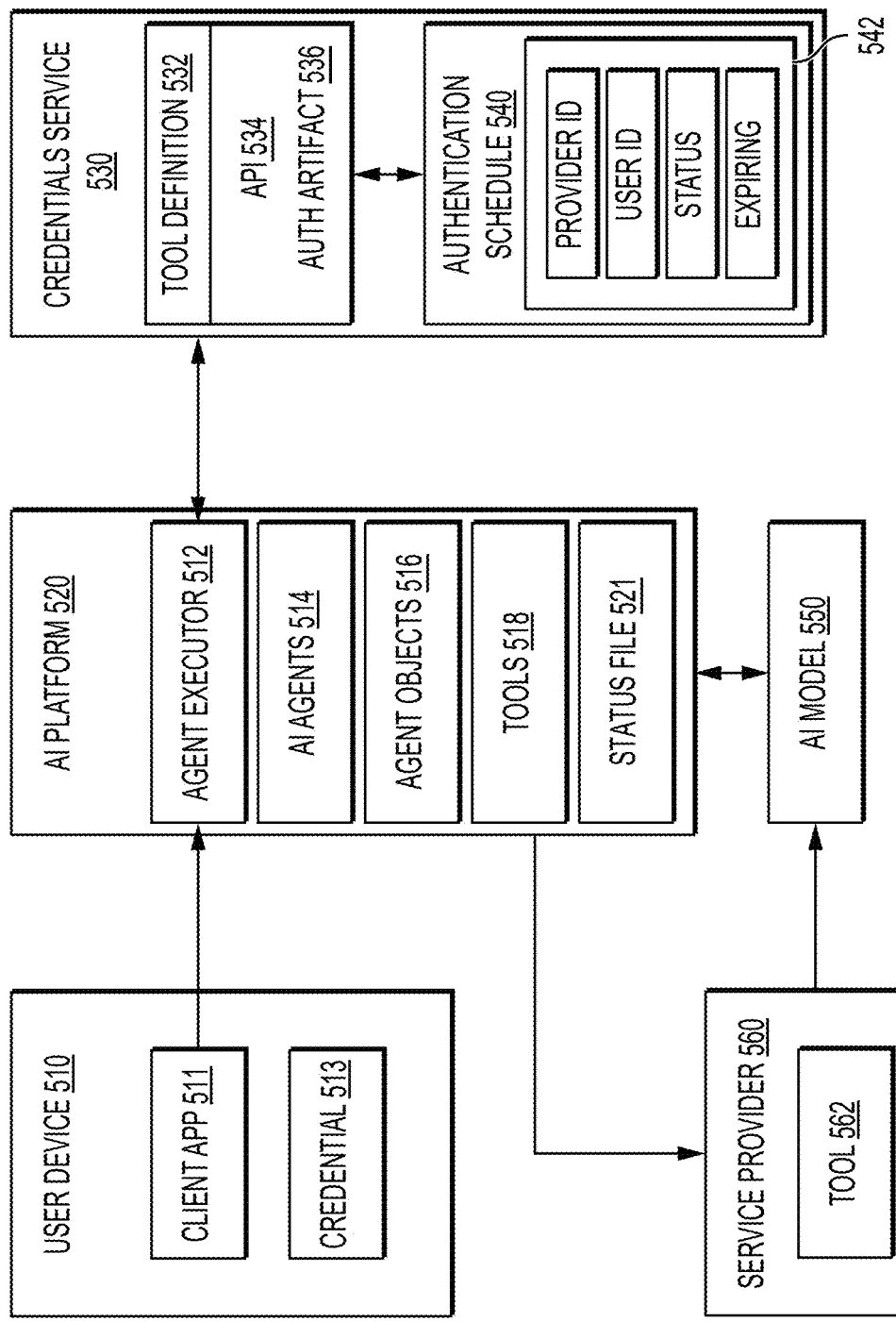
FIG. 5 is an example diagram of system components for just-in-time tool usage for an AI model.

FIG. 5 is an example diagram of system components for just-in-time tool usage for an AI model. A user device 510 can be any processor enabled device, such as a laptop, virtual reality headset, phone, and the like. The user device 510 can execute a client application 511, which can attempt to utilize an AI agent. The client application 511 can be a web browser, a custom application that executes locally, or a cloud-based application that displays a UI locally on the user device.

To access the AI agent, the client application 511 can send an input to an endpoint, which can be located in the cloud. The endpoint can be associated with AI platform 520, which can include being at a gateway for accessing one or more AI agents 514 of the AI platform 520. An agent executor 512 can monitor communications at the endpoint and be triggered into action when an input is received. The input can be validated, such as with a user token or other user credential 513 that is received with the input.

Traffic can be routed through CloudFlare DNS. The AI platform can be hosted in in a production cloud, in an example. This production cloud can include the AI platform 520, the gateway, data storage, AI models, and the like. Data storage can be tenant-aware (multi-tenant). Additionally, third-party AI Models 550 like CHATGPT are accessible through the AI platform 520.

The AI platform 520 can include one or more servers that execute processes for building, modifying, managing, and executing AI agents 514. Each AI agent 514 is made up of one or more agent objects 516. These are selected by an administrative user and connected to other agent objects 516 to create an AI agent 514. Agent objects 516 can include datasets, prompts, AI models, code blocks, and tools. Agent objects 516 can also include functional placeholders and other AI agents 514. The functional placeholders can represent an agent object 516 that is dynamically selected during execution of the AI agent 514 based on an AI management profile and agent executor 512. The agent executor 512 can utilize data connectors to send and receive data between different systems or platforms involved with the various agent objects 516.

The anticipatory authentication techniques discussed herein can apply to any type of agent object 516. For example, if an agent object 516 requires a login, the user can provide that and the AI platform 520 can utilize the resulting user token 536 (or other authentication artifact) in interacting with the agent object 516. Again, tools 518 are one type of agent object 516. The login can be user specific. Alternatively, administrative user can provide global credentials in an anticipatory manner when the global authentication is not valid.

Some agent objects 516 and tools 518 are maintained locally by the AI platform 520. Other tools 562 are controlled by third-party service providers 560. Likewise, AI models 550 can be provided by the AI platform 520 and third-party service providers.

To facilitate anticipatory (e.g., just-in-time) authentication, the agent executor 512 can utilize a credentials service 530. The credentials service 530 can be one or more processes that execute on one or more servers. It can be part of the AI platform 520 in an example. The credentials service can have its own API in one example. It also can execute as its own AI agent, allowing for agent-to-agent communications between the AI agent 514 attempting to access a tool 518 and the credentials service 530.

The credentials service 530 can track tool definitions 532. A tool definition 532 can include an API 534 for the tool 518. The tool definition 532 can include an authentication endpoint for authenticating the user with the service provider. Once the user is authenticated, the credentials service 530 can track an authentication token 536 for use in interacting with the tool.

Additionally, the credentials service can maintain an authentication schedule 540 to track which tool authorizations are valid, invalid, and set to expire. This can allow the credentials service 530 to anticipate when to authenticate a user or global account. In one example, the credentials service 530 includes a file or database 542 that tracks provider ID (i.e., a unique tool identifier), user ID, the status of the user's authorization by the provider, and an expiration date of the authorization. This information can be provided to the agent executor 512 for purposes of determining when to pause execution and perform an anticipatory authentication. Pausing execution can include storing the current state of AI agent execution in a status file 521.

Other examples of the disclosure will be apparent to those skilled in the art from consideration of the specification and practice of the examples disclosed herein. Though some of the methods described have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for anticipated tool authentication for artificial intelligence ("AI") agents, comprising:
   assigning, by an AI platform, a first tool to an AI agent, the first tool being selected from a plurality of tools and being connected for operation with at least one agent object of the AI agent;
   receiving an input, from a user device associated with a user, at an endpoint associated with the AI agent;
   determining that the AI agent needs to access the first tool as part of AI agent execution;

determining an authentication artifact is not received from a credentials service in response to a request that identifies the user, the authentication artifact authorizing communication with the first tool on behalf of the user;

storing a current state of the AI agent instead of continuing to execute the AI agent;

causing user authentication with a provider of the first tool, wherein the user authentication occurs instead of a global authentication of the AI platform;

causing the credentials service to store the authentication artifact received from the provider, wherein the authentication artifact is specific to the user rather than to the AI platform;

executing the AI agent based on the current state, wherein the execution of the AI agent comprises:
sending the authentication artifact to the provider of the tool on behalf of the user; and
using data from the tool as an input to the at least one agent object; and providing an output to the user device based on execution of the AI agent.

2. The method of claim 1, wherein storing the current state of the AI agent includes storing a message history in a file.

3. The method of claim 2, wherein storing the current state includes storing chunks from a dataset previously used with the AI agent.

4. The method of claim 1, wherein storing the state is in response to determining that the authentication artifact is expired.

5. The method of claim 1, wherein the input is analyzed by an AI model as part of determining that the AI agent needs to access the first tool.

6. The method of claim 1, wherein the first tool is assigned to an AI model through use of a user interface by an administrator, wherein the AI model is among the at least one agent object.

7. The method of claim 6, further comprising generating a manifest file that describes the at least one agent object of the AI agent, wherein the manifest file identifies the first tool for use with the AI model.

8. The method of claim 7, wherein the first tool is associated with a first prompt for determining whether to use the first tool based on the input, wherein the first prompt is sent with the input to an AI model, and wherein an output from the AI model indicates whether to use the first tool.

9. The method of claim 1, wherein the first tool is one of multiple tools assigned to a first agent object.

10. The method of claim 9, wherein the first tool is another AI agent.

11. The method of claim 9, wherein the input causes an agent executor to check with the credentials service for the first tool but not a second tool of the multiple tools.

12. The method of claim 9, further comprising: in an instance in which the user cannot be authenticated with the first tool, resuming execution of the at least one agent object without use of the first tool.

13. The method of claim 1, wherein the assigning the first tool to the AI agent includes, on a user interface ("UI"):
adding the first tool to a first agent object, causing the UI to visually indicate an association of the first tool with the first agent object;
causing display of an options window for the first tool; and
selecting an option for the user authentication instead of global authentication of the AI platform, wherein the selection of the option triggers an update with the credentials service.

14. The method of claim 13, wherein a second tool with global authentication is assigned to the first agent object, and wherein executing the first agent object includes:
authenticating the user with the provider of the first tool; and
supplying a global credential to authenticate the AI platform with the second tool.

15. The method of claim 1, further comprising requesting, from a second API endpoint associated with the credentials service, a list of all tools with which the user has been authenticated, wherein the list includes expiration times for at least one currently authenticated tool.

16. The method of claim 1, further comprising sending an authentication token received from the provider of the first tool to the credentials service for storage, wherein the token is stored in association with a provider identifier and a user identifier of the user.

17. The method of claim 1, wherein authenticating the user includes sending the credentials to a first application programming interface ("API") endpoint.

18. The method of claim 1, wherein the credentials service notifies the AI agent in an instance in which the authentication artifact has expired, triggering reauthentication of the user with the provider.

19. A non-transitory, computer-readable medium containing instructions that, when executed by a hardware-based processor, causes the processor to perform stages for just-in-time tool authentication for artificial intelligence ("AI") agents, comprising:
assigning, at an AI platform, a first tool to an AI agent, the first tool being selected from a plurality of tools and being connected for operation with at least one agent object of the AI agent;
receiving an input, from a user device associated with a user, at an endpoint associated with the AI agent;
determining that the AI agent needs to access the first tool as part of AI agent execution;
determining whether a valid authorization exists for the user to use the first tool by accessing a credentials service;
in an instance in which the valid authorization does not exist:
pausing execution of the at least one agent object of the AI agent, including storing a current state of the AI agent;
prompting the user for credentials for the first tool;
authenticating the user with a provider of the first tool using the credentials, wherein the user authentication occurs instead of a global authentication of the AI platform;
updating the credentials service to reflect the authentication with the first tool, including storing a token received from the provider, wherein the token allows for use of the first tool on behalf of the user, wherein the token is specific to the user rather than the AI platform; and
resuming execution of the at least one agent object of the AI agent based on the current state, wherein the execution comprises:
sending the token to the provider of the tool on behalf of the user; and
using data from the tool as an input to the at least one agent object; and providing an output to the user device based on execution of the at least one agent object.

20. A system for just-in-time tool authentication for artificial intelligence ("AI") agents, the system comprising:
- at least one physical non-transitory, computer-readable medium including instructions; and
- at least one processor that executes the instructions to perform stages comprising:
  - assigning, at an AI platform, a first tool to an AI agent, the first tool being selected from a plurality of tools and being connected for operation with at least one agent object of the AI agent;
  - receiving an input, from a user device associated with a user, at an endpoint associated with the AI agent;
  - determining that the AI agent needs to access the first tool as part of AI agent execution;
  - determining whether a valid authorization exists for the user to use the first tool by accessing a credentials service;
  - in an instance in which the valid authorization does not exist:
    - pausing execution of the at least one agent object of the AI agent, including storing a current state of the AI agent;
    - prompting the user for credentials for the first tool;
    - authenticating the user with a provider of the first tool using the credentials, wherein the user authentication occurs instead of a global authentication of the AI platform;
    - updating the credentials service to reflect the authentication with the first tool, including storing a token received from the provider, wherein the token allows for use of the first tool on behalf of the user, wherein the token is specific to the user rather than the AI platform;
  - resuming execution of the at least one agent object of the AI agent based on the current state, wherein the execution comprises:
    - sending the token to the provider of the tool on behalf of the user; and
    - using data from the tool as an input to the at least one agent object; and
  - providing an output to the user device based on execution of the at least one agent object.

* * * * *